(12) United States Patent
Li

(10) Patent No.: US 8,239,720 B2
(45) Date of Patent: Aug. 7, 2012

(54) COMMUNICATION OVER PLURAL CHANNELS WITH ACKNOWLEDGMENT VARIABILITY

(75) Inventor: Naizhi Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 12/141,920

(22) Filed: Jun. 19, 2008

(65) Prior Publication Data
US 2009/0319851 A1 Dec. 24, 2009

(51) Int. Cl.
H04L 1/18 (2006.01)
(52) U.S. Cl. .................................................... 714/749
(58) Field of Classification Search .................. 714/749; 709/231–237
See application file for complete search history.

(56) References Cited

U.S. PATENT DOCUMENTS

| | | | |
|---|---|---|---|
| 5,517,668 A * | 5/1996 | Szwerinski et al. | 709/230 |
| 6,112,323 A * | 8/2000 | Meizlik et al. | 714/748 |
| 6,917,614 B1 | 7/2005 | Laubach et al. | |
| 7,000,026 B2 | 2/2006 | Beshai et al. | |
| 7,072,973 B1 | 7/2006 | Newson et al. | |
| 7,158,504 B2 | 1/2007 | Kadaba et al. | |
| 7,184,713 B2 | 2/2007 | Kadous et al. | |
| 7,310,670 B1 | 12/2007 | Walbeck et al. | |
| 7,343,170 B1 | 3/2008 | Feeney et al. | |
| 7,356,756 B1 | 4/2008 | Chan et al. | |
| 7,746,786 B2 * | 6/2010 | Ohishi et al. | 370/236 |
| 2002/0152299 A1 * | 10/2002 | Traversat et al. | 709/223 |
| 2003/0137939 A1 * | 7/2003 | Dunning et al. | 370/235 |
| 2004/0032853 A1 * | 2/2004 | D'Amico et al. | 370/349 |
| 2004/0088347 A1 | 5/2004 | Yeager et al. | |
| 2005/0063303 A1 * | 3/2005 | Samuels et al. | 370/229 |
| 2006/0092942 A1 | 5/2006 | Newson et al. | |
| 2006/0107166 A1 * | 5/2006 | Nanda | 714/748 |
| 2006/0168338 A1 | 7/2006 | Bruegl et al. | |
| 2007/0130253 A1 | 6/2007 | Newson et al. | |
| 2007/0162813 A1 * | 7/2007 | Nakashima | 714/749 |
| 2010/0128669 A1 * | 5/2010 | Chun et al. | 370/328 |
| 2010/0325507 A1 * | 12/2010 | Sung et al. | 714/749 |

OTHER PUBLICATIONS

Donahoo, et al., "Multiple-Channel Multicast Scheduling for Scalable Bulk-data Transport," in Proceedings of the Conference on Computer Communications (IEEE Infocom), Mar. 1999, pp. 847-855.
O'Malley, et al., "A Dynamic Network Architecture," ACM Transactions on Computer Systems, May 1992, pp. 110-143, vol. 10, No. 2.
Chen, et al., "The Case for Heterogeneous Wireless MACs," Proceedings of Hotnets-IV 2005 (Nov. 14-15, College Park, Maryland), 6 pages.
Rahman, et al., "Transport of Media Independent Handover Messages Over IP," MIPSHOP Working Group Internet Draft, http://www.tools.ietf.org/html/draft-rahman-mipshop-mih-transport-01, dated Oct. 20, 2006, pp. 1-24.

* cited by examiner

*Primary Examiner* — Scott Baderman
*Assistant Examiner* — Neil Miles

(57) ABSTRACT

Reliable communication may be implemented using various underlying transport mechanisms, where the underlying transport mechanisms may be reliable or non-reliable. When data is sent from a source to a destination, the source may sent acknowledgment requests (RACKs) to the destination, and may await acknowledgments (ACKs) from the destination. The RACKs and ACKs are sent over the underlying transport mechanism. The rate at which the data source requests acknowledgments from the destination may be varied, depending on the underlying transport mechanism, to achieve lower overhead and to optimize throughput. For example, RACKs may be sent relatively less frequently when the underlying mechanism implements guaranteed delivery, and may be sent relatively more frequently when the underlying transport does not provide guaranteed delivery.

15 Claims, 8 Drawing Sheets

COMMUNICATION OVER PLURAL CHANNELS WITH ACKNOWLEDGMENT VARIABILITY

BACKGROUND

In network communications, data may be transported using an underlying channel, such as Transport Control Protocol (TCP). For example, two people may communicate with each other using an instant messaging (IM) application. The two people each run instances of the IM application on their respective machines, and these two instances of the IM applications send messages to each other over a network. However, the IM application typically does not implement the transport of data. Rather, the IM application uses an existing data transport channel, such as TCP, to transport the data from one person's machine to another. In addition to IM, applications such as on-line conferencing, voice communications, audio streaming, etc., may use TCP or other existing channels to transport data.

There are various channels through which data may be transported. In addition to TCP, data may also be carried via the User Datagram Protocol (UDP), guaranteed-delivery relay services such as Traversal Using Relay Network address translation (TURN), non-guaranteed-delivery relay services such as Microsoft Messenger service, or various other channels. When data is to be sent, in theory the data could be carried by any of these channels. From the perspective of a program that sends data from one place to another, the program is performing its function as long as the data gets transported from point A to point B, regardless of the actual mechanism that is used to transport the data. Thus, a service could be provided to the program that sends data over some channel, while hiding the details of the particular channel that is being used.

The service could provide "reliable" transmission of data. Data transmission can be either "reliable" (in the sense that delivery of the data is guaranteed), or "non-reliable" (in the sense that data delivery is not guaranteed). Some of the underlying channels that the service could use already provide reliable transmission of data, while other channels are non-reliable. Of the example channels mentioned above, TCP and TURN are considered reliable, while UDP and Microsoft Messenger are considered non-reliable. Reliability mechanisms are generally implemented through an acknowledgment scheme, in which receipt of data is acknowledged, and any data that is not acknowledged is retransmitted. A system of acknowledgments and retransmission may be implemented on top of a non-reliable channel in order to provide guaranteed delivery. However, when this system of acknowledgments and retransmission is implemented on top of an already-reliable channel, then the added acknowledgments may create extra traffic that decreases throughput. Using one reliability mechanism on top of another may also create various types of conflicts between the mechanisms. For example, the TCP congestion control algorithm has been found to conflict with a stacked TCP congestion algorithm, and could significantly degrade the end-to-end throughput.

SUMMARY

A reliable communication service may be built on top of various different channels. When data is to be transmitted from one node to another (from a source node to a destination node), a program that generates the data at the source node may provide the data to the communication service. The service may then transmit the data to the destination using some underlying channel, such as TCP, UDP, etc. While data is being transmitted, the service may also use the channel to send requests for acknowledgment (RACKs) to the destination. Acknowledgments (ACKs) may be received from the destination node in response to the RACKs. The rate at which RACKs are sent to the destination may be controlled by parameters that vary based on the underlying transport mechanism that is being used. Thus, when the underlying transport channel is a reliable mechanism such as TCP, RACKs may be sent relatively infrequently. When the underlying transport channel is a non-reliable mechanism such as UDP, RACKs may be sent more frequently. In addition to the rate at which RACKs are sent, the number of outstanding RACKs that may be awaiting an ACK at a given time could be limited based on the choice of transport channel.

Using the above techniques, a protocol may be provided that implements reliable transmission of data over various different channels, and/or that supports switching between different channels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
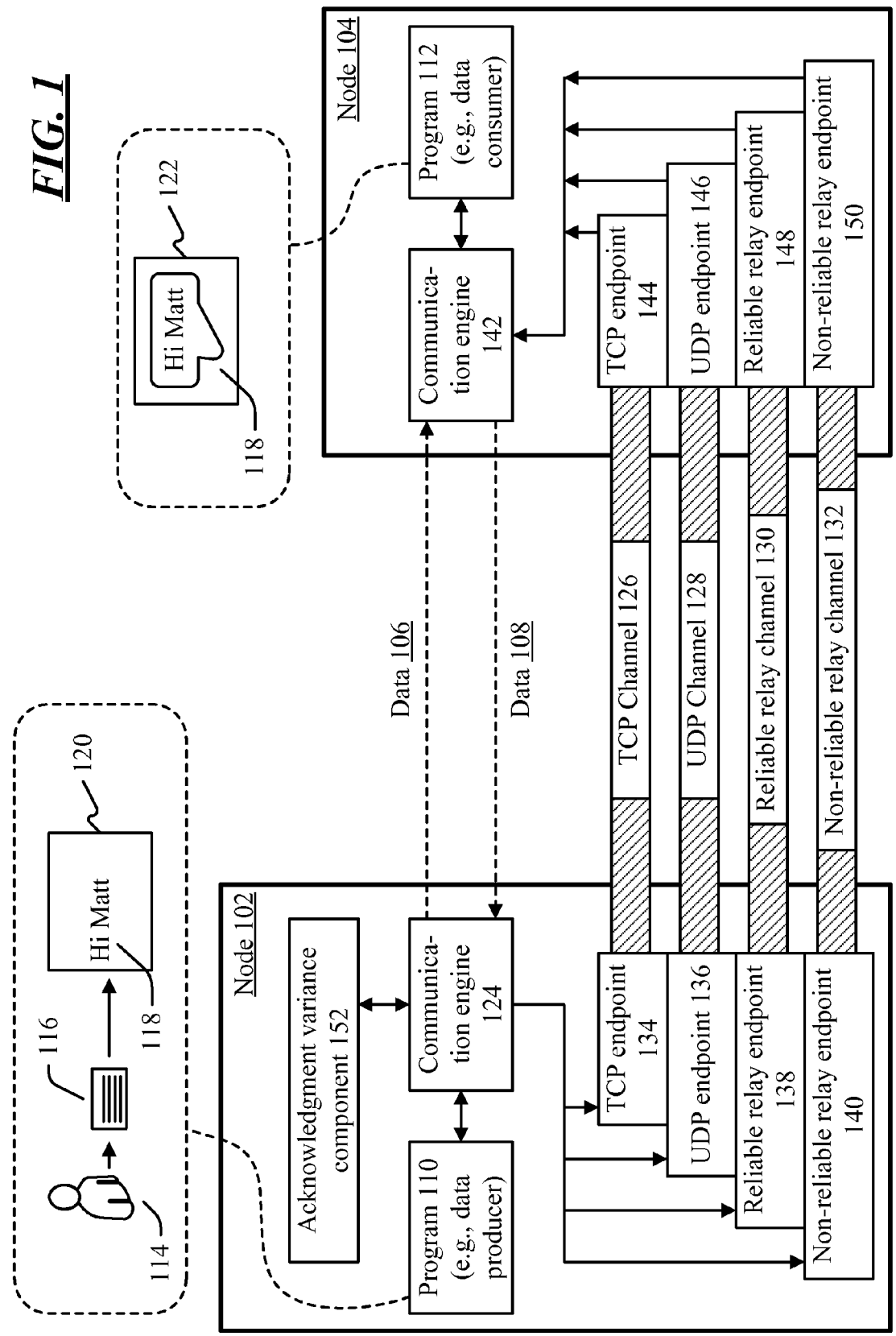
FIG. 1 is a block diagram of an example system in which data is transmitted from one node to another.

Machines in a network may communicate with each other through an underlying transport mechanism. Programs that run on these machines may send data to network destinations, and these programs typically use the available transport mechanisms to send the data. For example, an IM application allows a person on one machine to send a message to another person on another machine. However, the IM application typically does not directly negotiate the transmission of data through the network. Rather, the IM application provides the data to an existing transport channel, such as TCP, UDP, etc., and the transport channel sends the data to the destination through the network. Other types of applications (e.g., on-line conferencing, voice communications, audio streaming, etc.) may also work in this manner.

An application can perform the function of sending data from one place to another regardless of the underlying transport mechanism that is used. For example, if an IM application's function is to send a message from one person's computer to another person's computer, the IM application can discharge this function regardless of whether the message travels by TCP, UDP, or some other mechanism. Although the data may be transmissible through a variety of channels, there may be a reason to choose one channel over another. For example, if one channel is slow or stalled, then another channel could be used. Thus, it may be convenient to expose a service to the application, where the service can send data over various different channels while abstracting the details of those channels. In one example, the service may provide reliable communication. The service may implement this reliable communication over various channels, some of which are reliable and some of which are non-reliable. (In a broad sense, channels may be classified into the types "reliable" and "non-reliable" based on whether they provide guaranteed delivery of data. However, a particular channel may have properties beyond its membership in one of these broad categories. For example, the Microsoft Messenger service is technically a non-reliable channel since it does not provide guaranteed delivery, but in practice packets sent over that channel are rarely dropped.)

Reliable communication may be implemented on top of a non-reliable channel by building the mechanisms used for reliability on top of the non-reliable channel. Reliability is normally built using a framework of acknowledgment messages. In such a framework, when a source node sends data to a destination node, the source sends a request for acknowledgment (RACK) to the destination at various points in time, and the destination replies by sending an acknowledgment (ACK) of the data that it has received so far. Typically, the data is packaged into packets (packetized), and each packet is assigned a sequence number. An acknowledgment may indicate the highest sequence number that has been received by the destination. Reliable transport mechanisms such as TCP implement this kind of framework, but such a framework could be built on top of a non-reliable mechanism like UDP by sending the RACKs and ACKs as UDP datagrams.

When RACKs and ACKs are added to a data stream, the RACKs and ACKs may have different effects depending on whether the channel is reliable or non-reliable. For example, since reliable mechanisms like TCP implement their own system of RACKs and ACKs, transmitting many additional RACKs and ACKs over TCP creates extra traffic. This extra traffic may slow throughput by consuming bandwidth, although the reliability provided by these extra RACKs and ACKs may be redundant in view of TCP's built-in reliability. Thus, fewer RACKs and ACKs may be used when the channel is reliable than when the channel is non-reliable. Since ACKs are sent in response to RACKs, the rate at which RACKs are sent and/or the number of RACKs outstanding at a given time may be controlled based on the type of channel that is being used to transport data. In addition to controlling how RACKs are sent, the service could use the various channels in different ways based on those channels' different strengths and weaknesses.

The subject matter described herein provides mechanism that may be used to implement reliability over various different types of channels. These mechanisms may be used to vary the way in which RACKs are sent, or to vary the in which dropped packets are remedied, or to vary any other aspect of transmission, depending on the type of channel that is being used to transport data.

Turning now to the drawings FIG. 1 shows an example system in which data is transmitted from one node to another over various channels. In the example of FIG. 1, there are two nodes, node 102 and node 104. Node 102 may send data 106 to node 104. Additionally, node 104 may send data 108 to node 102. For illustration, the following discussion explains how data 106 may be transmitted from node 102 to node 104, although analogous techniques could be used to transmit data 108 from node 104 to node 102.

Program 110 is software that operates on node 102, and that may generate data to be sent to node 104. Program 110 could be an application, a driver, an operating system, or any other type of program. Program 112 operates at node 104 and may consume data that node 102 sends to node 104. Like program 110, program 112 could be any type of program. In one example, program 110 could be a "producer" of data in the sense that it produces data that is to be transmitted to node 104, and program 112 may be a consumer of data received at node 104. However, programs 110 and 112 could have any functional roles.

In one example, program 110 may be an instance of an IM application, and nodes 102 and 104 may be machines that two people are using to communicate with each other in an IM session. In such an example, program 112 may also be an instance of the IM application. Thus, by using programs 110 and 112 on nodes 102 and 104, respectively, a person 114 may use a keyboard 116 to enter a message 118 ("Hi Matt"), which may be displayed on monitor 120. (Keyboard 116 and monitor 120 may be attached to, or otherwise associated with, node 102.) When person 114 chooses to send message 118, that message is transmitted to node 104 in the form of data 106. On node 104, program 112 may receive the content of the message, and may display message 118 on monitor 122 associated with node 104. While FIG. 1 shows an example in which programs 110 and 112 are instances of IM programs that are being used to allow people to communicate with each other, the information communicated between nodes 102 and 104 could be any type of information, and it could arise in any context. Moreover, programs 110 and 112 could be instances of the same program, or they could be different programs. For example programs 110 and 112 could be instances of an on-line conferencing clients or peer-to-peer file-sharing programs. As another example, program 110 could be an on-line backup program and program 112 could be a server that receives data to be stored in a backup repository. As noted above, any type of programs could be used to generate and/or consume any type of data.

Program 110 sends data 106 to node 104 using communication engine 124. Communication engine 124 may expose, to program 110, a service through which program 110 may send data 106 to another node without program 110's being concerned with the details of how data 106 is transmitted. For example, communication engine 124 may use various channels to transport data 106 to node 104, such as TCP channel 126, UDP channel 128, reliable relay channel 130, or non-reliable relay channel 132. Communication engine 124 may create packets containing the data to be transmitted, and may provide these packets to a particular channel for transport to node 104. The channel that is being used for transport may implement a particular protocol, and may wrap the packets created by communication engine 124 with that protocol. (e.g., if the channel being used to transport data is TCP channel 126, then the packets created by communication engine 124 may be wrapped in TCP packets in order to be transported, and may also be subject to other aspects of the TCP protocol, such as TCP's flow-control mechanisms.)

Communication engine 124 may choose an appropriate channel for transmission of data 106, and may be able to send portions of data 106 via various channels depending on conditions. For example, TCP channel 126 may be fast when it is working. But if TCP channel 126 is not working, then communication engine may be able to switch to an alternative channel such UDP channel 128, which implements the (non-reliable) User Datagram Protocol. Or, communication engine 124 could switch to one of the relay channels, such as reliable relay channel 130 (e.g., a Traversal Using Relay Network address translation, or "TURN", service), or non-reliable relay channel 132 (e.g., the Microsoft Messenger service).

Node 102 may have a TCP endpoint 134, a UDP endpoint 136, a reliable relay channel endpoint 138, and/or a non-reliable relay endpoint 140. These endpoints may be implemented as software, firmware, etc., and may negotiate the sending of data across channels 126-132. For example, communication engine 124 may provide data 106 to TCP endpoint 134, and TCP endpoint 134 may arrange to have data 106 sent over TCP channel 126, and may also provide the services associated with that channel. For example, TCP is a reliable communication mechanism in the sense that it guarantees delivery of data. Data transmitted over TCP channel 126 is packetized, and each packet sent over TCP channel 126 is either acknowledged by its recipient or is retransmitted. Thus, TCP endpoint 134 may arrange to receive the acknowledgments, and to buffer and retransmit those packets that are not acknowledged. TCP endpoint 134 could also implement other aspects of TCP, such as flow control. The foregoing are examples of services that an endpoint could provide, although an endpoint could provide any service associated with a particular channel.

A communication engine and various endpoints may also be implemented on node 104. Thus, node 104 may have communication engine 142, and may have TCP endpoint 144, UDP endpoint 146, reliable relay endpoint 148, and/or non-reliable relay endpoint 150. Endpoints 144-150 may receive data 106 over channels 126-132, and may pass the received data to communication engine 142. Communication engine 142 may then provide the received data 106 to program 112. Communication engines 124 and 142, and endpoints 134-140 and 144-150 may each be able to engage in two-way communication. Although FIG. 1 shows an example in which data flow into endpoints 134-140 and away from endpoints 144-150 (as indicated by the direction of the arrows leading into and away from those endpoints), the endpoints and engines may also support data flow in the reverse direction.

Communication engine 124 may request and receive acknowledgments along with the data it sends. As previously noted, reliable protocols such as TCP use acknowledgments, but a service implemented by communication engine 124 may have its own framework of acknowledgments that the service uses on top the underlying channel. Communication engine 124 may send and receive acknowledgments independently of (without regard to) the system of acknowledgments provided by the underlying channel. Communication engine 124 may use its own acknowledgment system for a variety of reasons. For example, as noted above, some of the underlying channels are non-reliable, and communication engine 124 may use acknowledgments to implement reliability on top of a non-reliable channel such as UDP. As another example, since communication engine 124 may be capable of switching channels, if the current channel becomes unusable (e.g., if the channel is slow or overburdened), then communication engine 124 may be able to switch to another channel while retransmitting unacknowledged packets. Thus, even in the case of a reliable channel like TCP, communication engine could determine that TCP channel 126 is too slow and could then switch to another channel (e.g., UDP channel 128). Upon making the switch, communication engine 124 could retransmit all of the packets that were transmitted on TCP channel 126 but that have not yet been acknowledged. The acknowledgments implemented on top of the underlying channel may thus be used to implement this type of channel switching. Implementing reliability on top of a non-reliable channel may involving sending acknowledgments more frequently and/or with different constraints than sending acknowledgments merely to support a potential switch from one channel to another. Thus, communication engine 124 may use an acknowledgment variance component 152 to vary the rate at which acknowledgments are sent, and/or to vary other parameters concerning acknowledgments. As one example implementation, communication engine 124 may send requests for acknowledgment (RACKs), and may do so at a rate chosen by acknowledgment variance component 152. (Communication engine 142 may also have an acknowledgment variance component, although for conciseness of the drawing in FIG. 1, an acknowledgment variance component is not shown for node 104.)

Figure 2:
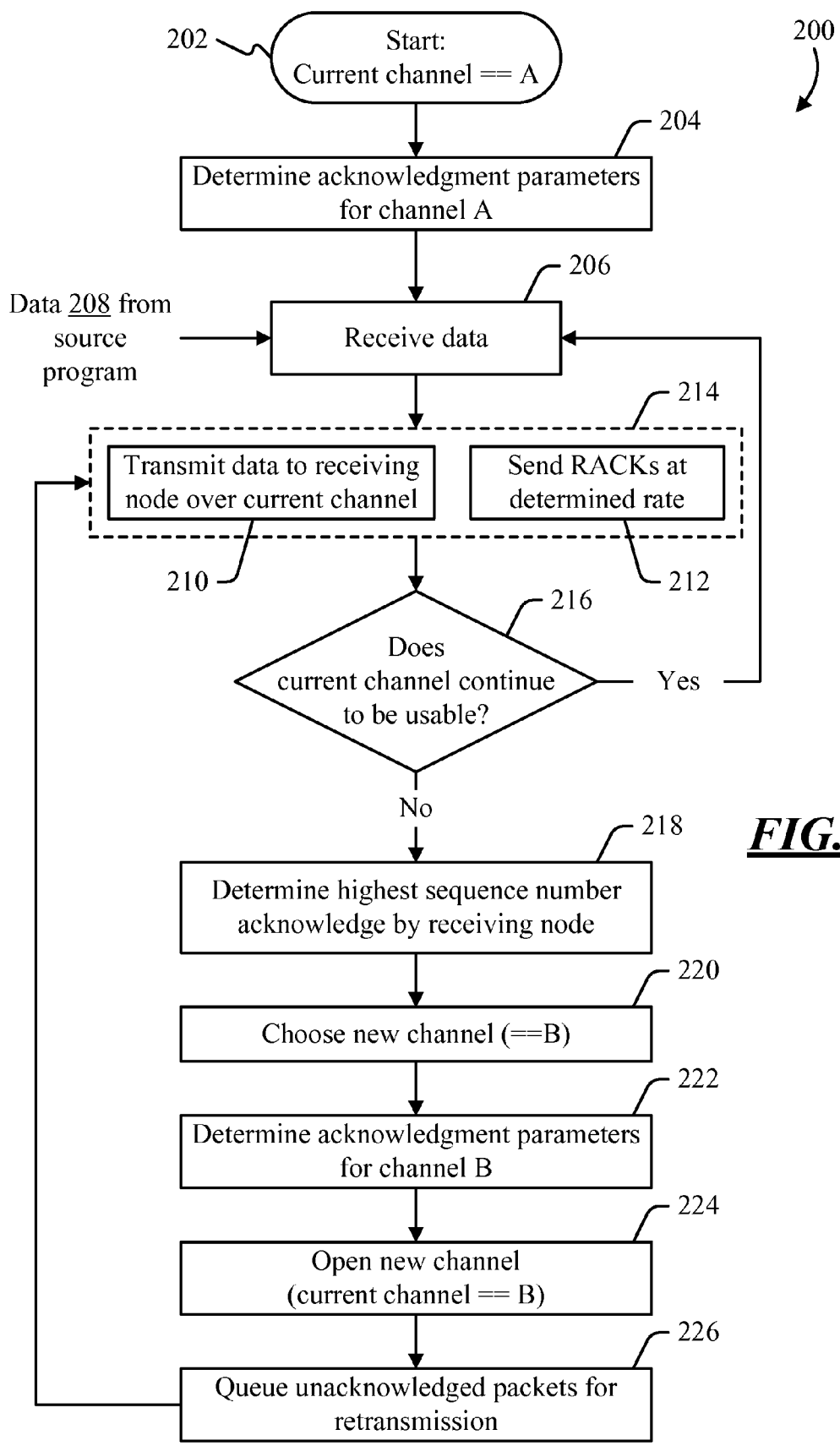
FIG. 2 is a flow diagram of an example process in which transmission of data is switched from a first channel to a second channel.

As noted above, a communication engine may transmit data using various channels, and may switch among these different channels. FIG. 2 shows an example process 200, which may be used to manage transmission of data, and in which transmission may be switched from a first channel to a second channel. Before turning to a description of FIG. 2, it is noted that the processes in the flow diagrams (in FIG. 2, as well as in the flow diagrams of FIGS. 5-8 described below) may be carried out using component shown and described herein, but could also be carried out using any components. For example, the process of FIG. 2 could be carried out by the communication engines shown in FIG. 1, but could also be carried out by any other system(s) or component(s). Additionally, each of the flow diagrams in FIGS. 2 and 5-8 shows an example in which stages of a process are carried out in a particular order, as indicated by the lines connecting the blocks, but the various stages shown in these diagrams can be performed in any order, or in any combination or sub-combination.

Returning to the description of FIG. 2, at 202 process 200 starts. In process 200, there is a notion of a "current channel," which is the channel that, at a given time, is being used to transport data. At the start of process 200, a particular channel is chosen as the current channel, and this channel is labeled "A" in FIG. 2. The chosen channel could one of channels 126-132 (shown in FIG. 1), or could be some other channel. For example, process 200 may begin with TCP channel 126 (shown in FIG. 1) as the current channel.

Figure 3:
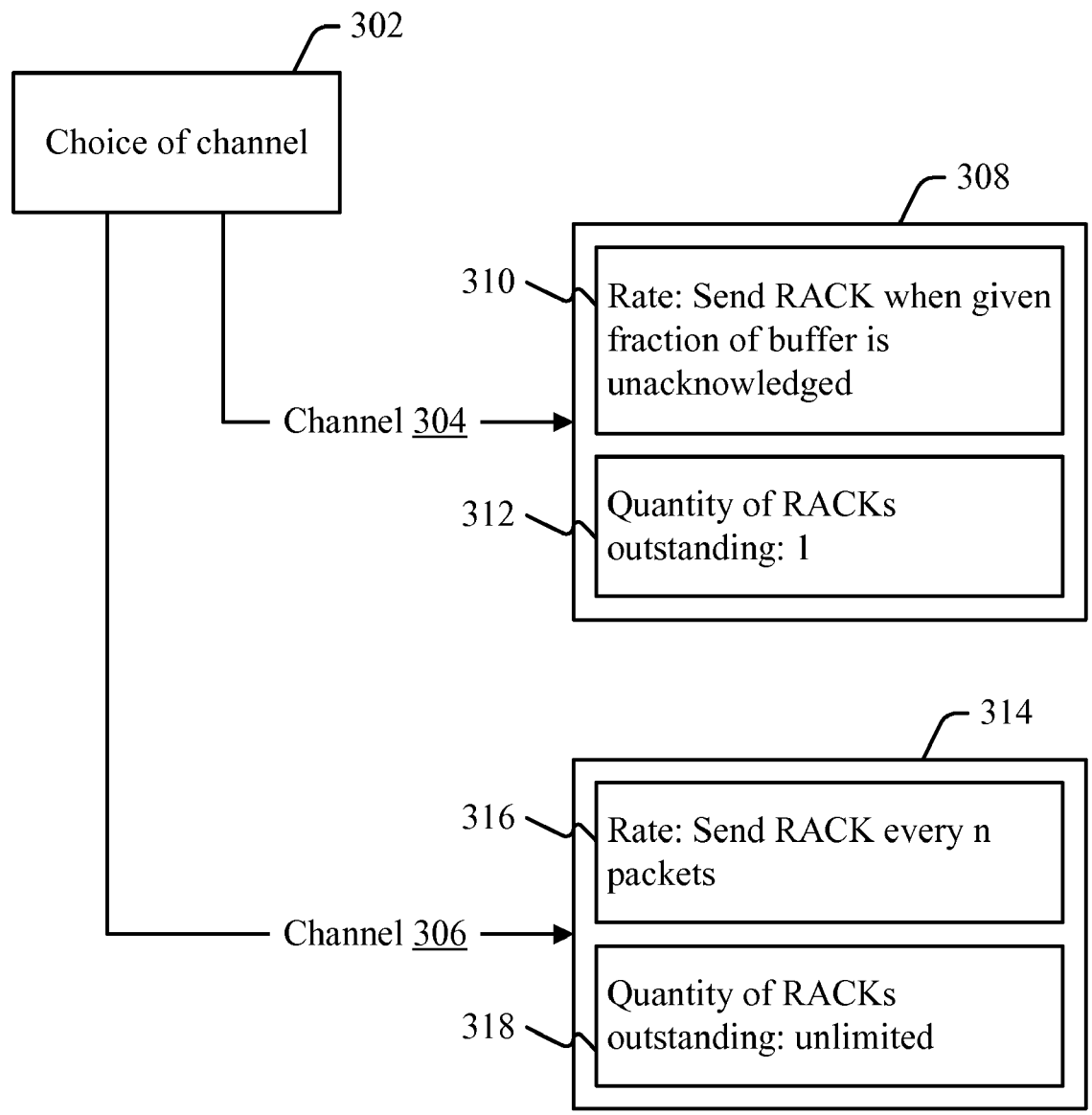
FIG. 3 is a block diagram of example acknowledgment parameters that may be chosen based on a choice of channel.

At 204, acknowledgment parameters are chosen for the initially-chosen current channel. Acknowledgment parameters may affect the rate at which acknowledgments are requested, or may affect other aspects of acknowledgments. The rate at which acknowledgements are requested could be defined as sending a RACK every n packets (where n is greater than zero), every n seconds, when n % of a transmission buffer contains unacknowledged packets, etc. The foregoing examples are some specific ways that the rate of requesting acknowledgments could be defined, although the rate could be defined in any manner. In addition to specifying the rate at which acknowledgments are to be requested, the parameters chosen at 204 could specify other aspects of the acknowledgments, such as the number of acknowledgments that are to be outstanding, how long to wait for an acknowledgment before retransmitting a packet, etc. FIG. 3 (discussed below) shows some examples of parameters that could be set for different channels, and the aspects of acknowledgments that could be affected by the parameters.

At 206, data 208 is received from a source program. For example, with reference to the example IM scenario shown in FIG. 1, a person could type a message into an IM application, and the IM application could provide data containing this message to a communication engine. The communication engine could then send the data to the intended recipient's machine. In this example, the IM application is a source program, and data 208 comprises the message that was entered into the IM application.

Data is then transmitted to the receiving node over the current channel (at 210), and RACKs are sent according to the chosen parameters (at 212). Transmission of data and sending of RACKs may take place concurrently. For example, process 200 may send some data received from a source program, then may send a RACK, then may send some more data, and so on. Box 214, which encloses blocks 210 and 212, shows that data and RACKs may be sent in any order, or in no particular order (although, as noted above, any stages shown in any of the processes depicted herein could be performed in any order regardless of the order in which those stages are shown).

At 216, it is determined whether the current channel continues to be usable. For example, if the current channel is TCP channel 126 (shown in FIG. 1), then it is determined at 216 whether the TCP channel continues to be usable. Usability may be defined in any manner. For example, a channel may be considered unusable if transmitted data has remained unacknowledged for some amount of time, or if a data flow test indicates that the channel is congested, or if a physical component of the channel has become disconnected or has stopped working. The foregoing are some examples of how a channel could be unusable, although a channel could be considered unusable for any reason. One example of an unusable channel is a channel through which data passage has, for some reason, become impossible. However, impossibility of transmission is not a prerequisite for finding that a channel is unusable. A channel could be considered unusable even if data is able to flow through the channel. For example, data might flow slowly through the channel, or it might be discovered that another channel offers faster passage of data. Either of these circumstances might bear on the usability of a channel.

If the channel continues to be usable, then process 200 returns to 206 to receive more data, and then continues to transmit the data and RACKs (at 210 and 212) on that channel. On the other hand, if the channel is unusable, then the process continues to 218, in order to prepare to switch to another channel.

At 218, the highest packet sequence number acknowledged by the receiving node is determined. For example, if the sending node has transmitted packets numbered zero through one-thousand, and the highest sequence number received in an ACK message is 500, then 500 is the highest sequence number acknowledged by the receiving node.

At 220, a new channel is chosen. In the example of FIG. 2, this new channel is labeled "B". Any channel could be chosen. For example, if process 200 initially chooses a TCP channel as channel A, then channel B could be a UDP channel. At 222, the acknowledgment parameters applicable to the new channel B are chosen. For example, when using channel B, RACKs could be sent at a particular rate, or there could be a particular number of RACKs that are permitted to be outstanding at a given time, or there could be a particular amount of time to wait for a packet to be acknowledged, etc. The foregoing are examples of acknowledgment parameters that could be set for channel B.

At 224, the new channel (B) is opened. At this point, the current channel is B instead of A. Those packets that were transmitted but whose receipt has not been acknowledged may be queued for retransmission on the new channel (at 226). For example, if it was determined at 218 that the highest sequence number acknowledged is 500, then those packets that have been transmitted and have sequence numbers higher than 500 are queued for retransmission on the new channel. Process 200 then returns to box 214, where the unacknowledged packets are transmitted on the new current channel (at 210), while sending RACKs at an appropriate rate for the new current channel (at 212). The process then continues from that point as before, except that the "current channel," in this example, now refers to channel B instead of channel A. Of course, continuing the process could also involve a further channel change (e.g., from channel B to a new channel C, or back to A), and these changes could be performed ad infinitum in the manner described above.

As noted above, the acknowledgment parameters that are used may be chosen based on the channel that is used to transmit data. FIG. 3 shows examples of various parameters that may be chosen based on the choice of channel.

At one or more points before or during transmission of data, a choice of channel is made (block 302). In FIG. 3, the choice is depicted as being between two channels 304 and 306, although the choice could be made among any number of channels.

Figure 9:
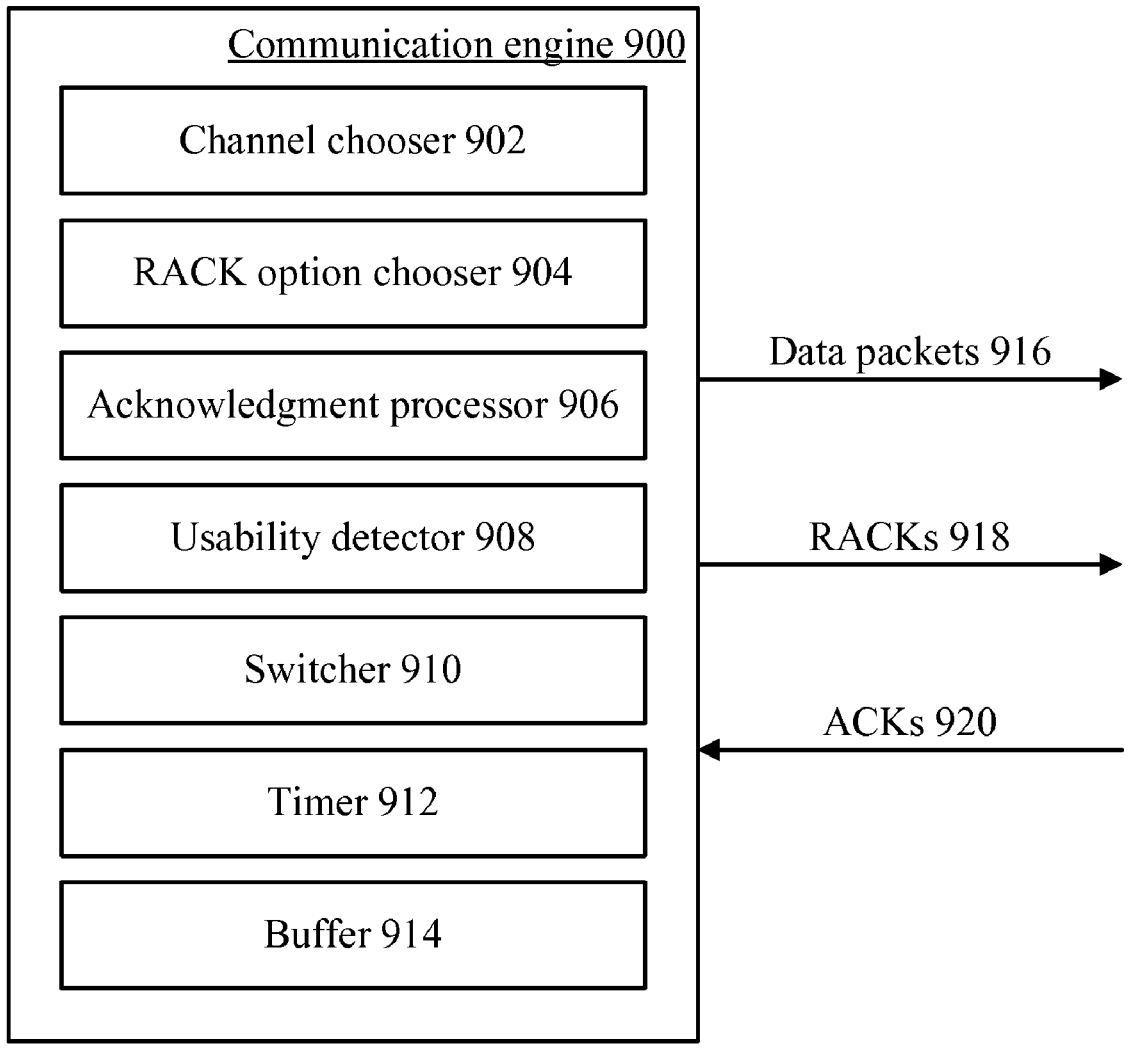
FIG. 9 is a block diagram of an example communication engine.

If channel 304 is chosen, then parameters 308 are chosen to govern acknowledgments when data is transmitted on that channel. Parameters 308 may include any aspect of acknowledgments. In the example shown, parameters 308 include a rate 310 at which RACKs are to be sent, and a constraint 312 on the quantity of RACKs that may be outstanding at a given point in time. Rate 310 may be expressed in any manner—e.g., one RACK per n packets, one RACK every n seconds, etc. In the example of FIG. 3, rate 310 is expressed as a function of the size of a buffer that stores transmitted-but-unacknowledged packets. (Such a buffer is depicted in FIG. 9 and is discussed below.) Thus, rate 310 indicates that a RACK is to be sent when an amount of unacknowledged data in the buffer reaches or exceeds a specified fraction or percentage of the buffer's size (e.g., 50%).

Constraint 312 specifies a constraint on the quantity of RACKs that are allowed to be outstanding (awaiting acknowledgment) at a given time. Example constraint 312 specifies that one RACK may be outstanding at a given time. A constraint on the quantity of RACKs that may be outstanding is not necessarily a strict numerical limit. Rather, the limit on the quantity of outstanding RACKs may vary based on circumstances. For example, there could be a numerical limit on newly-issued RACKs that does not include re-transmissions of old RACKs (e.g., an old RACK might be re-transmitted if no answer to the RACK is received in some amount of time). Thus, constraint 312 might specify that only one newly-issued RACK may be outstanding, but any number of re-transmissions of old, unanswered RACKs may also be outstanding. Thus, such a constraint may allow one new RACK plus any number of retransmitted RACKs. Such a constraint may still be viewed as a constraint on the quantity of RACKs, even if such a constraint does not impose a fixed numerical limit on the number of outstanding RACKs.

If channel 306 is chosen, then parameters 314 are chosen to govern acknowledgments. Parameters 314 may include a rate 316 and a constraint 318 on the number of outstanding acknowledgments. In the example of parameters 314, rate 316 specifies that a RACK is to be sent every time n packets have been transmitted. In one example, n is equal to one, so that a RACK is sent for every packet, although n could be set to any value. Constraint 318 specifies that the number of RACKs that may be outstanding is unlimited.

Parameters 308 and 314 may differ from each other. In one example, parameters 308 may be appropriate for a TCP channel (or other reliable channel) and parameters 314 may be appropriate for a UDP channel (or other non-reliable channel). However, any set of parameters could be chosen for any channel.

Figure 4:
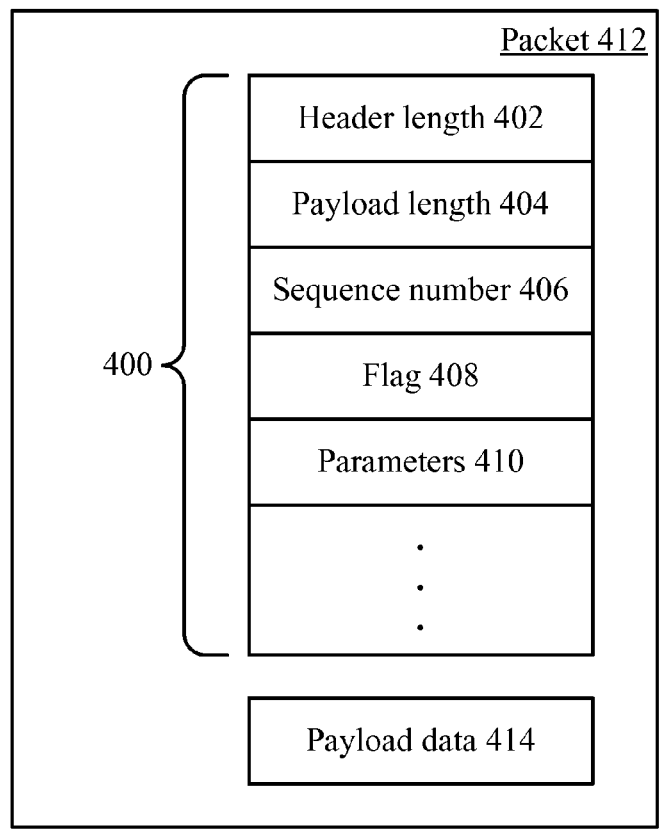
FIG. 4 is a block diagram of an example packet and its header.

A communication engine (such as engine 124, shown in FIG. 1) may packetize the data that it transmits over various channels. The packets that communication engine applies may have a header containing certain information. FIG. 4 shows an example header 400.

Header 400 comprises a plurality of fields, such as header length 402, payload length 404, sequence number 406, and an arbitrary number of pairs of flag 408 and parameter 410.

Header length 402 specifies the length of header 400. Header 400 may be followed by payload data 414, and header length 402 specifies the length of the header (e.g., as a number of bytes), in order to define the boundary between the header and the payload. Payload length 404 specifies the length of the payload data 414 that follows the header. Sequence number 406 is the number of the packet with respect to some order. For example, the first packet in a stream could have a sequence number of 0, and subsequent packets could be numbered 1, 2, 3, etc.

Flag 408 and parameter 410 specify various types of information that may be relevant to a communication protocol. Typically, flag 408 indicates the presence of a message that is used by a communication protocol, and parameter 410 contains specific data that is part of the message. Some flags are followed by a parameter, and others are not. Some specific examples of flags and/or parameters:

Flag=RACK: Request acknowledgment of packets; no parameters.

Flag=ACK: Acknowledgment of packets received; the parameter is the highest sequence number up to which packets have been received in a continuous sequence—e.g., if a receiving node has received packets 1-99, 101-150, and 151-500, then the parameter for an ACK message would be 99, since 99 is the highest number for which it is true that all packets up to that number have been received.

Flag=CHK: Checksum; the parameter contains a checksum of the payload.

Flag=SYN: Synchronize at the beginning of a packet stream; the parameter is the sequence number of the first packet that will appear in the stream.

Flag=RST: Reset; the recipient says the current packet stream is invalid, and requests that the sender restart the packet stream by sending a new SYN message to synchronize the stream at some starting packet number; no parameter to a RST flag.

The foregoing are examples of flags and parameters, although any flags and/or parameters could be contained in a packet header.

Packet header 400 may be part of a packet 412. The packet may carry both packet header 400, as well as payload data 414.

Figure 5:
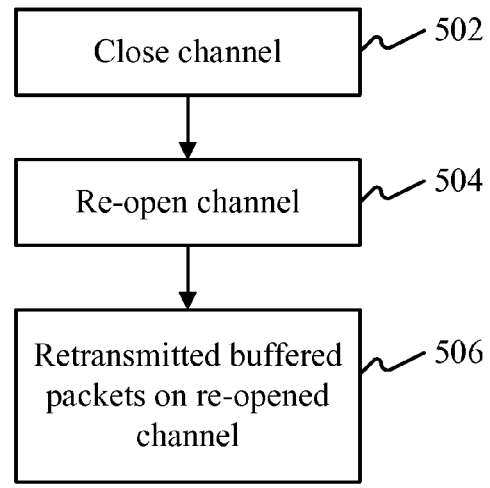
FIG. 5 is a flow diagram of an example process that may be performed while data is being transmitted on a channel.

FIG. 5 shows an example process that may be performed while data is being transmitted on a near reliable channel. For example, the process of FIG. 5 could be performed while the actions in box 214 (shown in FIG. 2) are also being performed (although the process of FIG. 5 could be performed at any time and in any context).

At 502, a channel is closed. The closure of a channel may take place in response to some problem on the channel (e.g., a packet not being acknowledged, the channel becoming congested, etc.), although a channel could be closed for any reason. At 504, the channel is re-opened. At 506, buffered data that has been transmitted to a destination node, but that has not been acknowledged by that node, is retransmitted on the channel. As described above in connection with FIG. 2, when a channel has become unusable, data transmission may be switched to a different channel. However, when a problem arises on a channel, closing and reopening the same channel may remedy the problem.

The closing and reopening of a channel could occur in any context and with any channel. However, one example of where the process of FIG. 5 may be used is where the channel is the Microsoft Messenger service. The Microsoft Messenger service is considered non-reliable in the sense that it does not guarantee delivery; however, in practice, packets on the Microsoft Messenger channel are rarely dropped (and thus may be referred to as "near reliable"). There is a computational overhead cost associated with tracking acknowledgments for individual packets and retransmitting individual packets. The alternative to tracking individual packets is to retransmit the entire buffer of transmitted-but-unacknowledged packets whenever a packet drop is detected. However, retransmitting an entire buffer has its own cost, in the sense that consuming a buffer-full of data consumes bandwidth. The cost of tracking individual packets may be justified for channels that drop packets often (e.g., UDP), but for a service such as Microsoft Messenger that rarely drops a packet, it may be less costly to retransmit the full buffer in the rare even that a packet is dropped, rather than to track individual packets. Thus, FIG. 5 may be used to remedy a dropped packet on a channel such as the Microsoft Messenger service (although, as noted above, the process of FIG. 5 could be used in any context). In situations where the underlying channel is not likely to drop a packet, handling dropped packets in the manner shown in FIG. 5 may be viewed as an optimization that avoids the cost of tracking and re-transmitting individual packets.

Figure 6:
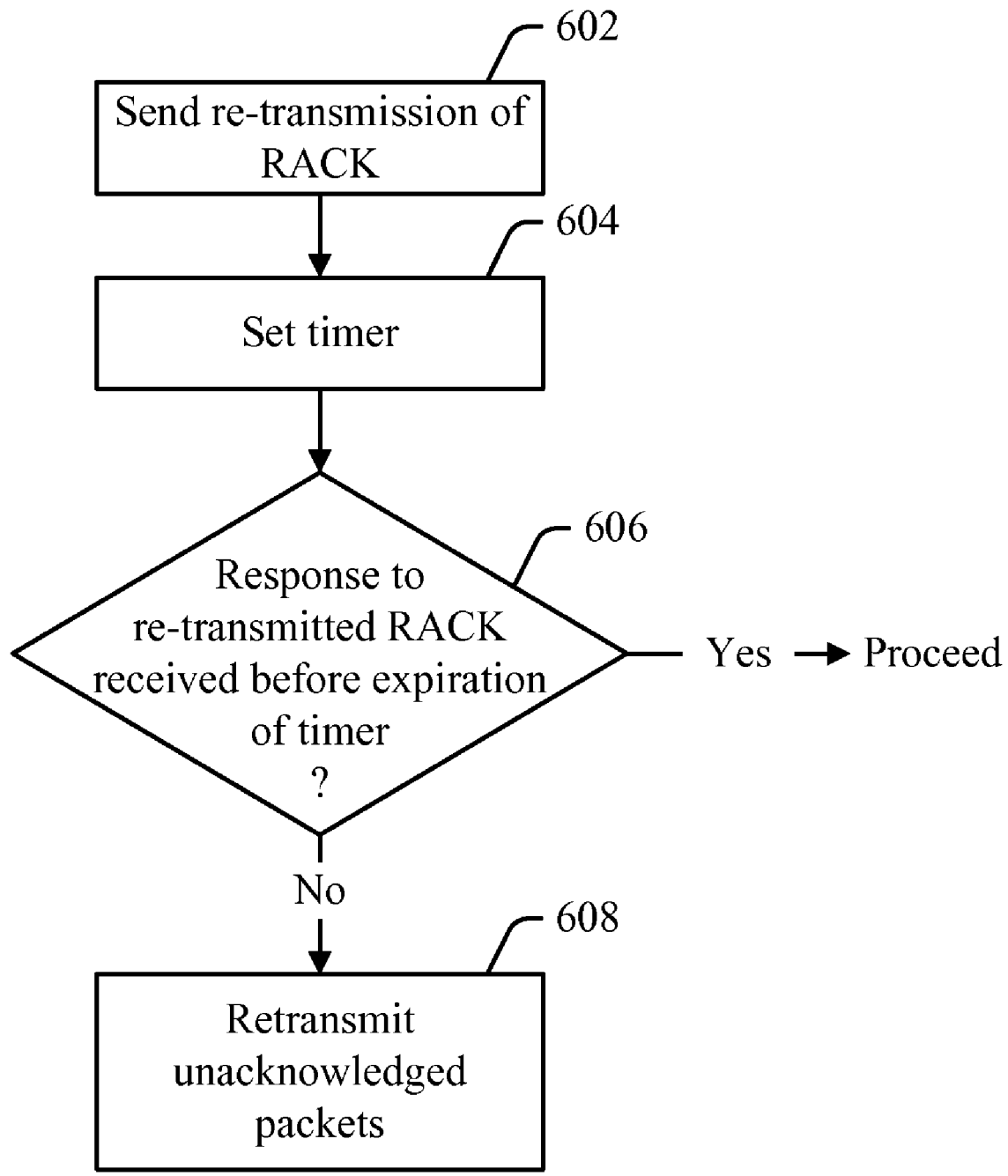
FIG. 6 is a flow diagram of an example process in which a RACK that has not been answered is retransmitted.

FIG. 6 shows an example process in which a RACK that has not been answered is retransmitted. For example, if the acknowledgment parameters are such that one RACK is outstanding at a given time and no ACK has been received in response to an outstanding RACK, then the process of FIG. 6 may be used to retransmit the RACK and to wait for the response.

At 602, a retransmission of a RACK is sent. At 604, a timer is set for the re-transmitted RACK. If a response to the re-transmitted RACK is received before expiration of the timer (as determined at 606), then the process proceeds to send data and RACKs (e.g., as in box 214 of FIG. 2). Otherwise, the packets for which acknowledgment was requested in the (unanswered) RACK are retransmitted (at 608). For example, if the RACK was sent following (or as part of) the packet that has sequence number n, and only packets up to sequence number m have been acknowledged so far (where m<n), then expiration of the timer may cause packets m+1 through n may be retransmitted at 608.

Figure 7:
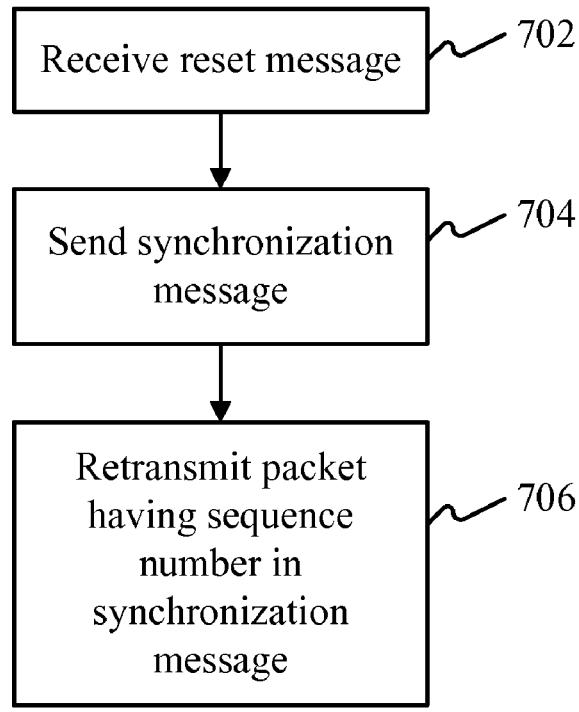
FIG. 7 is a flow diagram of an example process in which a node may request to reset a stream.

Sometimes, a node that is receiving data may experience an error and may be unable to process an incoming stream of packets. For example, the receiving node could experience a system crash, thereby losing its memory of the sequence number at which the packet stream began. An acknowledgment typically states a sequence number, thereby indicating that the recipient has received all packets up to that number. Without a memory of where the stream started, the recipient cannot send this kind of acknowledgment. FIG. 7 shows a way that a receiving node can request to reset the stream so that the recipient knows where the stream begins. At 702, the sending node receives a reset message (e.g., a message indicated by the RST flag, discussed above in connection with FIG. 4). At 704, the sending node sends a synchronization message (e.g., a message with the SYN flag). A parameter associated with the synchronization message indicates a sequence number that represents the start of the stream. For example, if the sending node has received acknowledgments for all packets up to sequence number n, then the synchronization message may indicate that the starting packet for reset stream is n+1. At 706, the packet having the sequence number in the synchronization message is retransmitted. Additionally, any buffered packets may be retransmitted if they have a higher sequence number than the starting sequence number for the stream.

Figure 8:
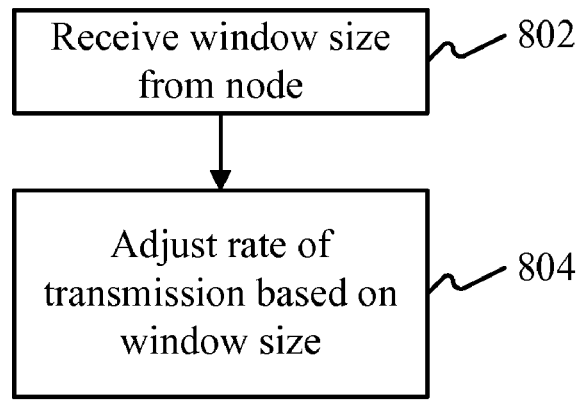
FIG. 8 is a flow diagram of an example process that may be used to implement flow control.

As noted above, reliable protocols (e.g., TCP) may implement flow control, so that a sending node slows down or stops transmission when the receiving node is receiving packets faster than they are being consumed by a program on that node. For example, with reference to FIG. 1, when data is transmitted to node 104, communication engine 142 may receive that data. However, the data is received by communication engine 142 in order to be consumed by program 112, and it is possible that packets containing the data will pile up in storage on node 104 before they can be consumed by program 112. If this occurs, TCP may slow down or suspend transmission of data in order to allow the consumption of data to catch up with transmission. However, non-reliable protocols (e.g., UDP) often lack this kind of flow control. FIG. 8 shows a process that may be used to implement flow control on top of a protocol that lacks flow control.

At 802, the sending node may receive the current window size from the node to which packets are being sent. The window size refers to the amount of data that has been received at the destination node but that has not yet been consumed. Based on this window size, the sending node may adjust the rate at which data is being transmitted to the destination node (at 804). The window size could be used and/or interpreted in any manner in order to make this adjustment. For example, the data transmission rate could be decreased (or increased) if the window size is above (or below) a certain threshold. Or, as another example, several snapshots of the window size could be collected at different points in time in order to observe the growth or shrinkage in the window, and the data transmission rate could be adjusted accordingly.

FIG. 9 shows an example communication engine 900. Communication engine may comprise components, such as channel chooser 902, RACK option chooser 904, acknowledgment processor 906, usability detector 908, switcher 910, timer 912, buffer 914, and/or other components. The example of FIG. 9 shows components of communication engine 900, although communication engines 124 and 142 (shown in FIG. 1) may have similar components, which may implement functionality similar to that of communication engine 900.

Channel chooser 902 chooses a particular channel over which to transmit data. For example, channel chooser 902 may choose a particular channel among channels 126-132 (shown in FIG. 1). RACK option chooser 904 chooses acknowledgment parameters based on the channel that is to be used. For example, RACK option chooser 904 may choose a particular rate of sending RACKs, or a particular constraint on the number of RACKs that may be outstanding. This choice may be based on the particular channel and/or type of channel to be used. For example, if a non-reliable channel is to be used to transport data, then RACK option chooser 904 may use the fact that the channel is non-reliable as a basis to set a rate at which RACKs are to be sent and/or to set the rate in some particular way (e.g., a RACK every n packets). Acknowledgment variance component 152 (shown in FIG. 1) may be or contain an instance of RACK option chooser 904.

Acknowledgment processor 906 determines what, if any, actions are to be taken based on acknowledgments that have been received by communication engine 900. For example, if communication engine 900 receives an acknowledgment indicating that packets up to sequence number n have been received by a receiving node, then acknowledgment processor 906 may indicate that packets that have been acknowledged may be cleared from the buffer of acknowledged packets (described below).

Usability detector 908 determines the usability of a particular channel. For example, usability detector 908 may make decisions about the usability of a channel in the manner discussed above in connection with FIG. 2 at 216.

Switcher 910 changes the underlying channel that is used to transport data. For example, if a particular channel (e.g., channel A) is being used to transport data, switcher 910 may perform actions that change transmission to another channel (e.g., channel B). Switcher may, for example, implement actions at 218-226 of FIG. 2. Thus, switcher may determine, based on acknowledgments received, which packets would be retransmitted in the event of a channel switch, and may queue those packets for retransmission after the switch is performed. Switcher 910 may switch channels based on a determination that the current channel has become unusable, but could switch channels for any reason.

Timer 912 may be used to impose time limits on certain actions. For example, as noted above, a certain amount of time may be allowed for an acknowledgment request to be answered, and a packet that has been unacknowledged for some amount of time may be retransmitted. Timer 912 may be used to determine whether the time to wait for an acknowledgment has expired.

Buffer 914 may be maintained in order to store packets that have been transmitted but that have not been acknowledged. After a packet has been transmitted, if it has not yet been acknowledged then it may be retransmitted. Thus, buffer 914 stores packets that have been transmitted but that have not been acknowledged. Packets that have been acknowledged may be cleared from buffer 914. Buffer 914 may, for example, be implemented as a circular queue, but could also be implemented in other ways.

Communication engine 900 may operate on a node, and may communicate information with other nodes. For example, communication engine 900 may send data packets 916 and RACKs 918 to other nodes, and may receive ACKs 920 from other nodes. When communication engine 900 sends data packets to other nodes, those packets may carry payload data, but may also "piggyback" administrative messages (e.g., RACKs 918) as part of the header. Or, administrative messages such as RACKs 918 could be sent in their own packets that contain a header without a payload.

Figure 10:
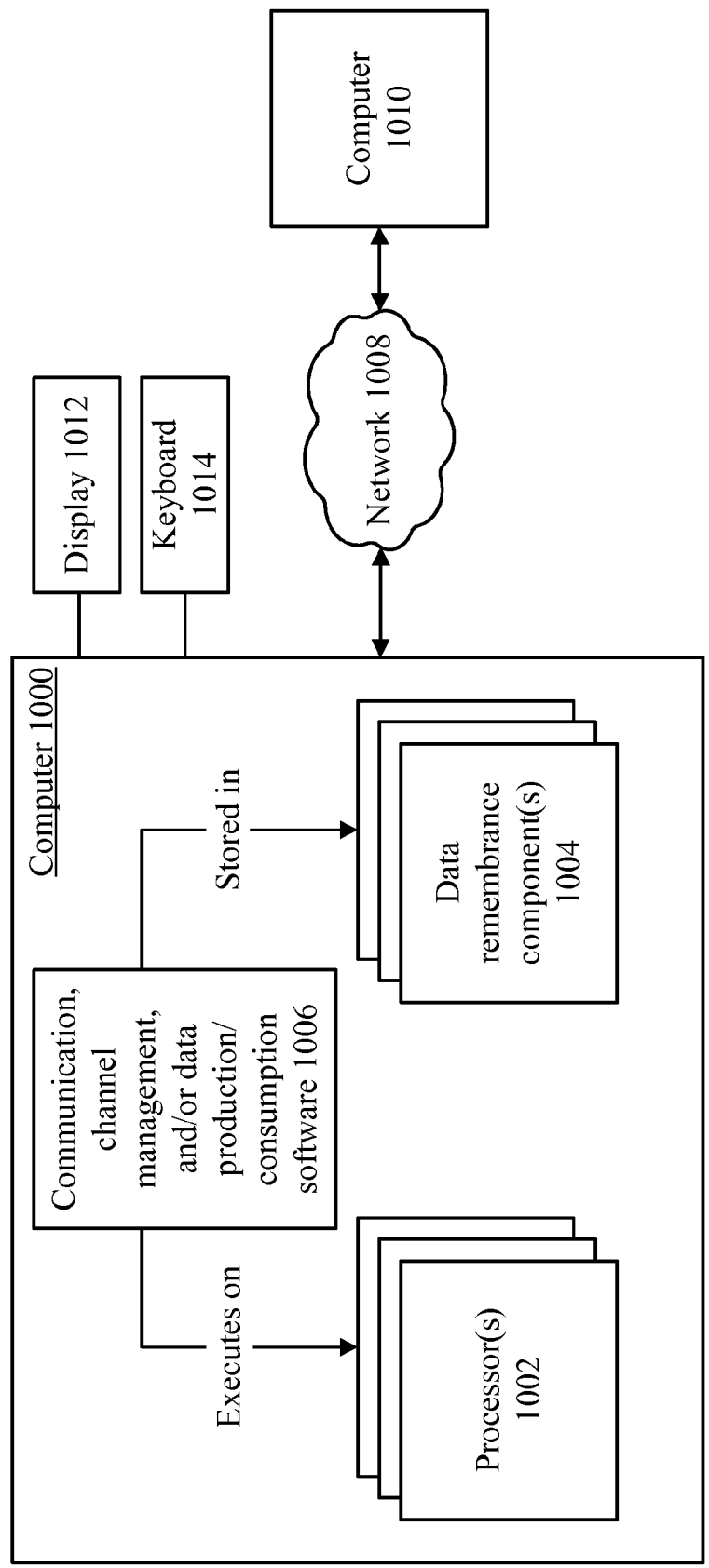
FIG. 10 is a block diagram of example components that may be used in connection with implementations of the subject matter described herein.

FIG. 10 shows an example environment in which aspects of the subject matter described herein may be deployed.

Computer 1000 includes one or more processors 1002 and one or more data remembrance components 1004. Processor(s) 1002 are typically microprocessors, such as those found in a personal desktop or laptop computer, a server, a handheld computer, or another kind of computing device. Data remembrance component(s) 1004 are components that are capable of storing data for either the short or long term. Examples of data remembrance component(s) 1004 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 1000 may comprise, or be associated with, display 1012, which may be a cathode ray tube (CRT) monitor, a liquid crystal display (LCD) monitor, or any other type of monitor. Computer 1000 may also comprise, or be associated with, an input device, such as keyboard 1014. Display 1012 and keyboard 1014 (or any other input and/or output devices) could be used by computer 1000 to receive and/or to provide data.

Software may be stored in the data remembrance component(s) 1004, and may execute on the one or more processor(s) 1002. An example of such software is communication, channel management, and/or data production/consumption software 1006, which may implement some or all of the functionality described above in connection with FIGS. 1-9, although any type of software could be used. Software 1006 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 10, although the subject matter described herein is not limited to this example.

The subject matter described herein can be implemented as software that is stored in one or more of the data remembrance component(s) 1004 and that executes on one or more of the processor(s) 1002. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 1000 may be communicatively connected to one or more other devices through network 1008. Computer 1010, which may be similar in structure to computer 1000, is an example of a device that can be connected to computer 1000, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to perform a method of communicating, the method comprising:
   transmitting a plurality of packets to a node via a first channel, each of the packets having a sequence number;
   determining that said first channel has become unusable;
   determining a highest sequence number acknowledged by said node;
   opening a second channel;
   determining one or more first parameters that govern sending acknowledgment requests for packets that are transmitted on said second channel, said first parameters specifying, as a constraint, that there may be only a fixed finite number of acknowledgment requests, and any retransmissions thereof, outstanding;
   retransmitting, to said node, via said second channel, those ones of said plurality of packets whose sequence number is higher than said highest sequence number acknowledged by said node; and
   maintaining a buffer of unacknowledged packets that have been transmitted to said node, said one or more first parameters being chosen based on said second channel's implementing a reliable transmission protocol, and a rate specifying that an acknowledgment request is to be sent when an amount of unacknowledged data in said buffer reaches a specified fraction of a size of said buffer.

2. The one or more computer-readable storage media of claim 1 said fixed finite number of requests being one request.

3. The one or more computer-readable storage media of claim 1, wherein one or more second parameters govern sending acknowledgment requests for packets that are transmitted on said first channel, and wherein said one or more first parameters differ from said one or more second parameters.

4. The one or more computer-readable storage media of claim 1, wherein said first parameters specify both said rate and said constraint.

5. The one or more computer-readable storage media of claim 1, wherein said packets are wrapped by a protocol implemented by said first channel, and wherein the method further comprises:
   sending said acknowledgment requests without regard to acknowledgments that are issued as part of said protocol.

6. The one or more computer-readable storage media of claim 1, wherein said buffer stores at least some of said plurality of packets, and wherein the method further comprises:
   closing said first channel;
   reopening said first channel; and
   after said reopening, retransmitting over said first channel those packets that are in said buffer.

7. A method of managing transmission of data, the method comprising:
   receiving the data from a first program;
   choosing a first channel through which information is transmissible to a node;
   determining, based on a first type of said first channel, a first rate at which to send acknowledgment requests, and also determining a first quantity constraint that specifies that there may be only a fixed finite number of acknowledgment requests, and any retransmissions thereof, outstanding;
   transmitting a first portion of the data over said first channel;
   sending acknowledgment requests to said node at said first rate and subject to said first quantity constraint;
   choosing a second channel through which information is transmissible to said node;
   determining, based on a second type of said second channel, a second rate at which to send acknowledgment requests, said second rate differing from said first rate;
   transmitting a second portion of the data over said second channel;
   sending acknowledgment requests to said node at said second rate;
   determining that a first acknowledgment request has not been acknowledged by said node;
   sending a re-transmission of said first acknowledgment request; and setting a timer that causes a packet transmitted before initial transmission of said first acknowledgment request to be retransmitted unless an acknowledgment to said re-transmission is received before said timer expires.

8. The method of claim 7, wherein the data is packaged into a stream of packets, each of the packets having a sequence number, and wherein the method further comprises:
receiving, from said node, a first message to reset said stream of packets;
sending, to said node, a second message to synchronize said stream at a first sequence number; and
retransmitting at least some of said packets starting with a first packet that has said first sequence number.

9. The method of claim 7, further comprising:
receiving, from said node, a message comprising a window size that represents an amount of the data that has been transmitted to said node but that has not been consumed by a second program that operates on said node; and
adjusting a transmission rate based on said window size.

10. The method of claim 7, further comprising:
determining a second quantity constraint on outstanding acknowledgment requests, said second quantity constraint being applicable when said data is transmitted on said second channel, said second quantity constraint differing from said first quantity constraint.

11. The method of claim 7, wherein a buffer stores at least some of the data that has been transmitted to said node but that has not been acknowledged by said node, wherein said first channel comprises Transmission Control Protocol (TCP), and wherein, based on a fact that said first channel comprises TCP, said first rate is chosen to send a second acknowledgment request when an amount of the data in said buffer reaches or exceeds a particular percentage of a size of said buffer.

12. The method of claim 7, wherein said first channel comprises User Datagram Protocol (UDP), and wherein, based on a fact that said first channel comprises UDP, said first rate is chosen to send an acknowledgment request for each packet sent to said node.

13. A system comprising:
a processor;
a data remembrance component;
a data producer that is stored in said data remembrance component and that is executable on said processor;
a communication engine that receives data from said data producer and that sends said data to a node, the communication engine comprising:
a channel chooser that chooses a first channel over which to send said data;
an RACK-option chooser that chooses first options to be used in sending RACKs to said node; and
an acknowledgment processor that sends said RACKs to said node with a constraint specified by said first options that specifies that there may be only a fixed finite number of acknowledgment requests, and any retransmissions thereof, outstanding;
the system further comprising:
a usability detector that determines whether said first channel is usable or unusable; and
a switcher that, upon a determination by said usability detector that said first channel is unusable, causes said channel chooser to choose a second channel over which to send said data, causes said RACK-option chooser to choose second options to be used in sending requests for acknowledgment (RACKs) to said node, and causes said communication engine to send at least some of said data to said node over said second channel and to send RACKs to said node at a rate specified by said second options, said switcher also causing said communication engine to send RACKs to said node under a constraint on outstanding RACKs, said constraint being specified by said second options.

14. The system of claim 13, further comprising:
a timer that determines, based on a RACK that has been sent to said node and on which acknowledgments (ACKs), if any, have been received from said node, a length of time that a packet has remained unacknowledged, and that determines whether to retransmit said packet based on said length of time.

15. The system of claim 13, further comprising:
a buffer that stores that portion of said data for which receipt has not been acknowledged by said node, said buffer having a size, wherein said first channel comprises Transmission Control Protocol (TCP), and wherein said RACK-option chooser determines, based on a fact that said first channel comprises TCP, that a RACK is to be sent when an amount of said data that is in said buffer reaches or exceeds a particular percentage of said size.

* * * * *